United States Patent [19]
Faust et al.

[11] 4,171,343
[45] Oct. 16, 1979

[54] STARTUP PROCEDURE FOR THE SYNTHESIS OF AMMONIA

[75] Inventors: Paul J. Faust, Dickinson; Otto C. Pless, Jr., Alta Loma, both of Tex.

[73] Assignee: Standard Oil Company (Indiana), Chicago, Ill.

[21] Appl. No.: 931,847

[22] Filed: Aug. 7, 1978

[51] Int. Cl.$^2$ ................................................ C01C 1/04
[52] U.S. Cl. .................................... 423/359; 252/376
[58] Field of Search ............................... 423/359–363; 252/374–377

[56] References Cited

U.S. PATENT DOCUMENTS

| | | | |
|---|---|---|---|
| 1,893,492 | 1/1933 | Brill | 423/360 |
| 3,309,306 | 3/1967 | MacLaren | 423/361 |

FOREIGN PATENT DOCUMENTS 1817632  8/1969  Fed. Rep. of Germany ........... 423/360

*Primary Examiner*—O. R. Vertiz
*Assistant Examiner*—Thomas W. Roy
*Attorney, Agent, or Firm*—Thomas J. Connelly; Arthur G. Gilkes; William T. McClain

[57] ABSTRACT

An improved startup procedure for the synthesis of ammonia in which preheated feed streams of desulfurized hydrocarbon gas, steam and air are routed through an ammonia train having a primary and secondary reformer, a high and low temperature CO shifter, a $CO_2$ removal system, a methanator and a synthesis converter system. The improvement comprises simultaneously heating the primary and secondary reformers with steam while heating the low temperature CO shifter with preheated desulfurized hydrocarbon gas. After these systems have been heated sufficiently, feed streams of preheated desulfurized hydrocarbon gas and steam are injected into the reformers along with the addition of air into the secondary reformer to produce reformed gas which is then used to preheat the high temperature CO shifter. Simultaneously, exhaust gas from the low temperature CO shifter along with a portion of the gas converted in the high temperature CO shifter is used to preheat the $CO_2$ removal system. Once these systems have been heated sufficiently, the preheated feed streams from the primary and secondary reformers are passed through the high temperature CO shifter, through the low temperature CO shifter, and through the $CO_2$ removal system into a methanator in order to preheat it. From the methanator, the feed streams are passed into a preheated synthesis converter system wherein a converter vessel is heated to start the production of ammonia.

10 Claims, 2 Drawing Figures

STARTUP PROCEDURE FOR THE SYNTHESIS OF AMMONIA

BACKGROUND OF THE INVENTION

1. Field of the Invention

This invention relates in general to an improved startup procedure on ammonia plants for the synthesis of ammonia. Such a process is beneficial for providing a time savings, a cost savings and an energy savings. In particular, this new procedure comprises the simultaneous preheating of the primary and secondary reformers with steam while also preheating a low temperature CO shifter with preheated desulfurized hydrocarbon gas. After these systems have reached a satisfactory temperature, feed streams of preheated desulfurized hydrocarbon gas and steam are injected into the reformers along with air to the secondary reformer to produce reformed gas which is then used to preheat the high temperature CO shifter. Simultaneously, exhaust gas from the low temperature CO shifter along with a portion of the gas converted in the high temperature CO shifter is used to preheat the $CO_2$ removal system. Once these systems have been heated sufficiently, the preheated feed steams from the primary and secondary reformers are passed through the high temperature CO shifter, through the low temperature CO shifter, and through the $CO_2$ removal system into a methanator in order to preheat it. From the methanator, the feed streams are passed into a preheated synthesis converter system wherein a converter vessel is heated to start the production of ammonia.

2. Description of the Prior Art

The principal industrial process developed for the production of ammonia involves the use of hydrocarbon feedstocks to furnish the source of hydrogen e.g., natural gas, for the reaction with atmospheric nitrogen to form ammonia. In such ammonia synthesis trains, the final production cost is affected by the length of time it takes to bring the train on stream and the amount of hydrocarbon gas feed which is required to preheat the various systems. Both of these factors are directly affected by the startup procedure one uses.

In recent years, there has been an increasing concentration on constructing ammonia plants on a larger scale, those have a capacity of from 600 to 1,500 tons/day. In addition, most of these new plants are designed to handle a natural gas feedstock, instead of coal or oil, and the price of natural gas has been rapidly increasing due to the world's current energy problem. These larger plants require a longer startup time because the equipment is proportionally larger and therefore it takes a greater amount of time to accomplish the preheating phase. A typical ammonia plant will, on the average, be completely shut down and started up again three to five times a year with each startup requiring approximately forty-sixty hours. These frequent shut downs are necessitated by mechanical equipment failures and routine turn-a-rounds.

The most common causes of delays in startup are attributed to: startup operating conditions, equipment problems and operator's human error. Included in startup operating conditions are difficulties more severe than those for which the equipment is specified, a typical example is the sequential double contingency such as trip out of a large turbine followed by mal-operation of the automatic turbine bypass valve. The resulting imbalance to the steam system requires shutdown and subsequent delay.

Under equipment problems are included a large variety of problems with one common feature—the equipment has not been manufactured or fabricated in accordance with specifications and drawings. The final category of human errors include all incidents where delay is attributed to operator error or improper direction and supervision. Although some of these delays in startup cannot be anticipated or avoided, it has been found that our improved process will reduce the time during which the plant is not on-stream. This is significant in terms of economics for anyone familiar with ammonia plants realizes that there is a strong incentive to get on line as quickly as possible. A standard cost estimate for a 1,500 ton on stream ammonia plant is $40,000/day, and when the plant is not on stream, the income is zero. By practicing our improved process one is able to decrease startup time by 10-20 hours depending on plant design. This reduction in time multiplied by the cost of natural gas, for example $2/million cubic feet, can result in a substantial cost saving. In addition, when an ammonia plant is being brought on stream, steam and hydrocarbon gas are used to bring the various systems up to the desired temperature. In most cases, the fumes emitted from the burning of this gas with air contains CO, $CO_2$, and nitrogen oxides, and these fumes are usually vented directly to the atmosphere. By reducing the time of startup one is able to reduce the amount of undesirable particulates which will enter the atmosphere. Therefore, a reduction in startup time has an additional environmental impact.

U.S. Pat. No. 3,947,551 of Parrish discloses an improved ammonia synthesis train utilizing hydrocarbon starting materials which are converted to hydrogen under superatmospheric pressure in a series of steps which include conversion of the hydrocarbons to hydrogen-carbon monoxide mixtures, shift conversion of the carbon monoxide to hydrogen and $CO_2$, and removal of the $CO_2$. In such a system, reduction in process gas losses is achieved through an improved arrangement and integration of the shift conversion and $CO_2$ removal steps. However, this patent does not teach the simultaneous preheating of certain vessels and/or systems to reduce startup time.

The general object of this invention is to provide an improved startup procedure for an ammonia plant so as to reduce startup time and conserve energy. A more specific object of this invention is to provide a new process which uses less hydrocarbon gas to preheat the various systems, thereby contributing to a cost savings.

Another object of this invention is to provide an improved startup procedure for an ammonia plant which reduces the amount of noxious emissions into the atomsphere.

SUMMARY OF THE INVENTION

Briefly this invention provides an improved startup procedure for the synthesis of ammonia by which a time, cost and energy savings are realized. This new procedure is applicable to an ammonia train having a primary and secondary reformer, a high temperature and a low temperature CO shifter, a $CO_2$ removal system, a methanator and a synthesis converter system. In practicing this new procedure, the primary and secondary reformers are preheated with steam while the low temperature CO shifter is simultaneously preheated by desulfurized hydrocarbon gas, preferably natural gas or naphtha. After these units are preheated to a sufficient temperature, preheated feed streams of desulfurized hydrocarbon gas and steam are injected into the primary and secondary reformers along with air to the secondary reformer to produce reformed gas. This reformed gas is then used to preheat the high temperature CO shifter, wherein the reformed gas is converted to converted gas, while at the same time, vented gas from the low temperature CO shifter is employed to preheat the $CO_2$ removal system. In addition, a portion of the converted gas produced in the high temperature CO shifter is also routed to the $CO_2$ removal system to aid in its preheating. When the above units have attained a sufficient operating temperature, the preheated feed streams from the primary and secondary reformers are passed through the high temperature and low temperature CO shifters, through the $CO_2$ removal system and into a methanator for the purpose of preheating it. From the methanator, the feed streams are routed to a synthesis converter system wherein a converter vessel is heated up. Once all the systems are brought on stream in a continuous train, the production of ammonia begins and the startup is complete.

It is contemplated that this new startup precedure can replace present startup procedures with little or no inconvenience or detrimental effect to machinery or equipment, and in no way will alter the quality of the final ammonia product.

DETAILED DESCRIPTION OF THE INVENTION

The process apparatus of the invention is essentially the same as the typical art process. In this respect, conventional units, catalysts and operating conditions are used unless otherwise specified. It should be noted that the main raw materials used for hydrogen production in an ammonia process are either natural gas, naphtha, fuel oils or refinery gases, particularly natural gas and naphtha. The following discussion will be directed to the use of natural gas.

Figure 1:
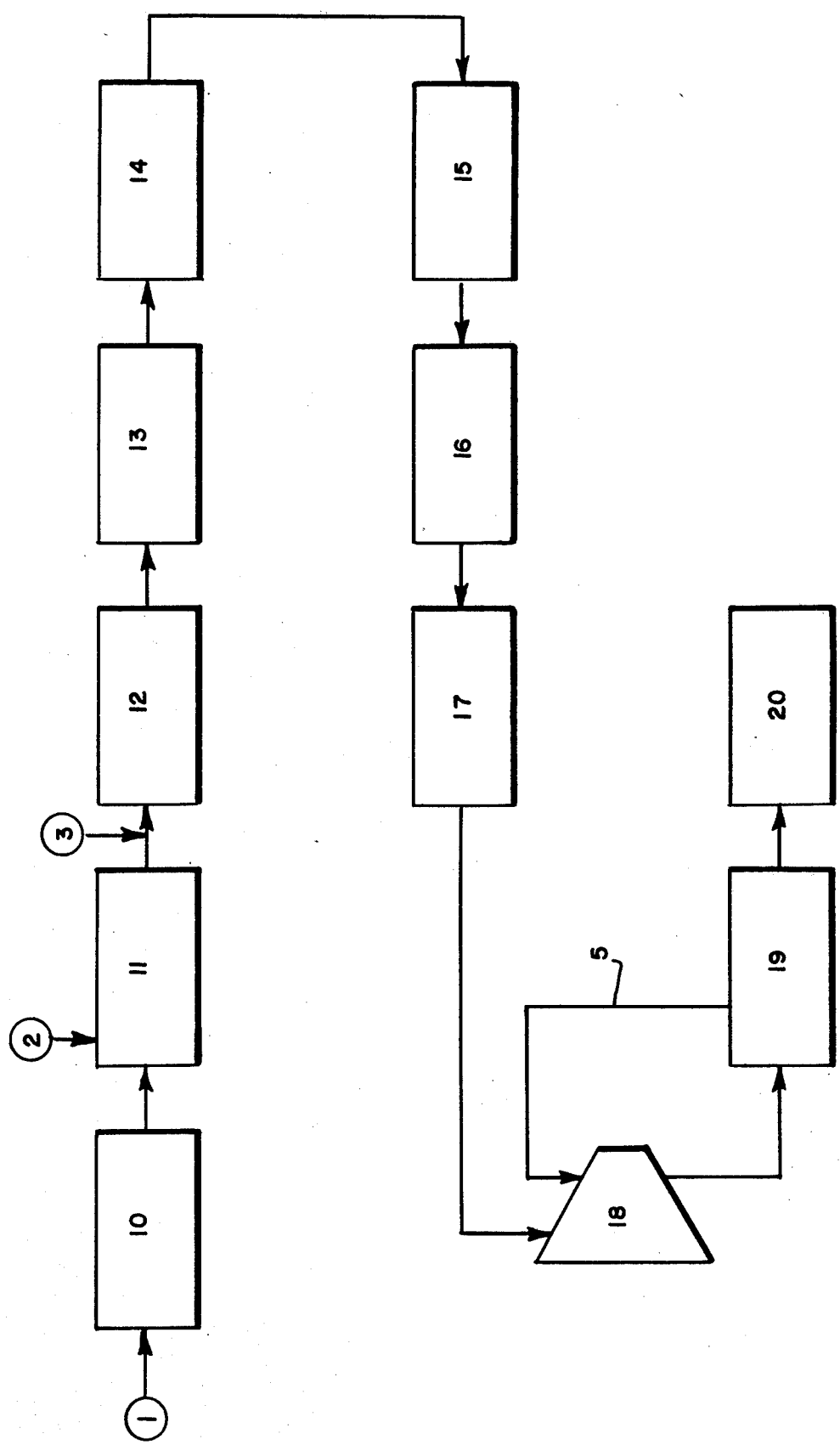
FIG. 1 is a flow chart depicting the startup procedure of the invention.

As shown in FIG. 1, natural gas feed stream 1 is fed to desulfurizer 10 before being preheated and fed to primary reformer 11. Within primary reformer 11 the preheated natural gas is mixed with incoming steam 2 to produce hydrogen. This is normally accomplished by reforming methane at about 1500° F. with sufficient steam and hydrocarbons over a conventional nickel-base catalyst. The chemical equation is as follows:

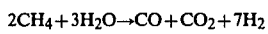

$$2CH_4 + 3H_2O \rightarrow CO + CO_2 + 7H_2$$

About 90% mole volume of the methane is converted to hydrogen in primary reformer 11 whereupon the gaseous stream is conveyed to secondary reformer 12. Air 3 is also injected into secondary reformer 12 so as to reform an additional 9% mole volume of the methane. The reaction within both reformers is exothermic and a rise in temperature in the range of 1500°–2500° F. is common. This excess heat can be recovered by passing the vented gas from secondary reformer 12 through waste heat boiler 13 so as to reduce the temperature of the gaseous mixture to approximately 600°–800° F. Steam is produced from waste heat boiler 13 and can be recirculated and reused in primary reformer 11 or in other locations. Inside primary reformer 11 and secondary reformer 12 the methane is reformed to reformed gas and is fed into high temperature CO shifter 14. A conventional shifter usually contains a two stage unit having multiple beds of catalysts. The first bed is a high temperature CO shifter having either an iron oxide or an iron-chromium oxide catalyst. The second bed is a low temperature CO shifter having a catalyst of chromium, copper, zinc or iron oxide. In FIG. 1, the gaseous mixture in high temperature CO shifter 14 is reduced in carbon monoxide content to 3% or less. This gas is then fed to low temperature CO shifter 15 wherein the carbon monoxide content is further reduced to 0.2–0.3%. The converted gas leaving low temperature CO shifter 15 is essentially all hydrogen, nitrogen and carbon dioxide with minor amounts of methane and carbon monoxide along with water vapor.

It should be noted that a one stage CO shift converter can be used but the two stage unit is preferred.

The converter gas from low temperature CO shifter 15 is fed to $CO_2$ removal system 16 wherein the carbon dioxide is removed. $CO_2$ removal system 16 is essentially a scrubber which can use a monoethanolamine solution as the scrubbing agent. Other scrubbing agents can be used, such as triethanolamine, potassium carbonate, "Sulfinol", the dimethyl ethers of polyethyleneglycol, acetone or water. From $CO_2$ removal system 16, the gaseous mixture is fed through methanator 17 wherein the residual carbon monoxide, about 0.3%, and carbon dioxide, about 0%, are converted to methane by reaction with hydrogen in the presence of a nickel base catalyst. This converted gas is then cooled to about 50°–100° F. and is fed through a series of compressors 18 so as to increase its pressure to about 2000–5000 psi. This higher pressure favors the production of ammonia. Upon leaving compressors 18 the gas enters synthesis converter system 19 wherein the hydrogen and nitrogen are synthesized to form ammonia ($NH_3$). The unreacted gas is recirculated through conduit 5 to compressors 18 and the cycle is repeated. Continuous recycling of the unreacted gas allows 95–98% of the hydrogen and nitrogen to be converted to ammonia. The produced ammonia from synthesis converter system 19 is fed to refrigeration system 20 to be cooled and condensed before being transferred to a storage facility or distributed.

Figure 2:
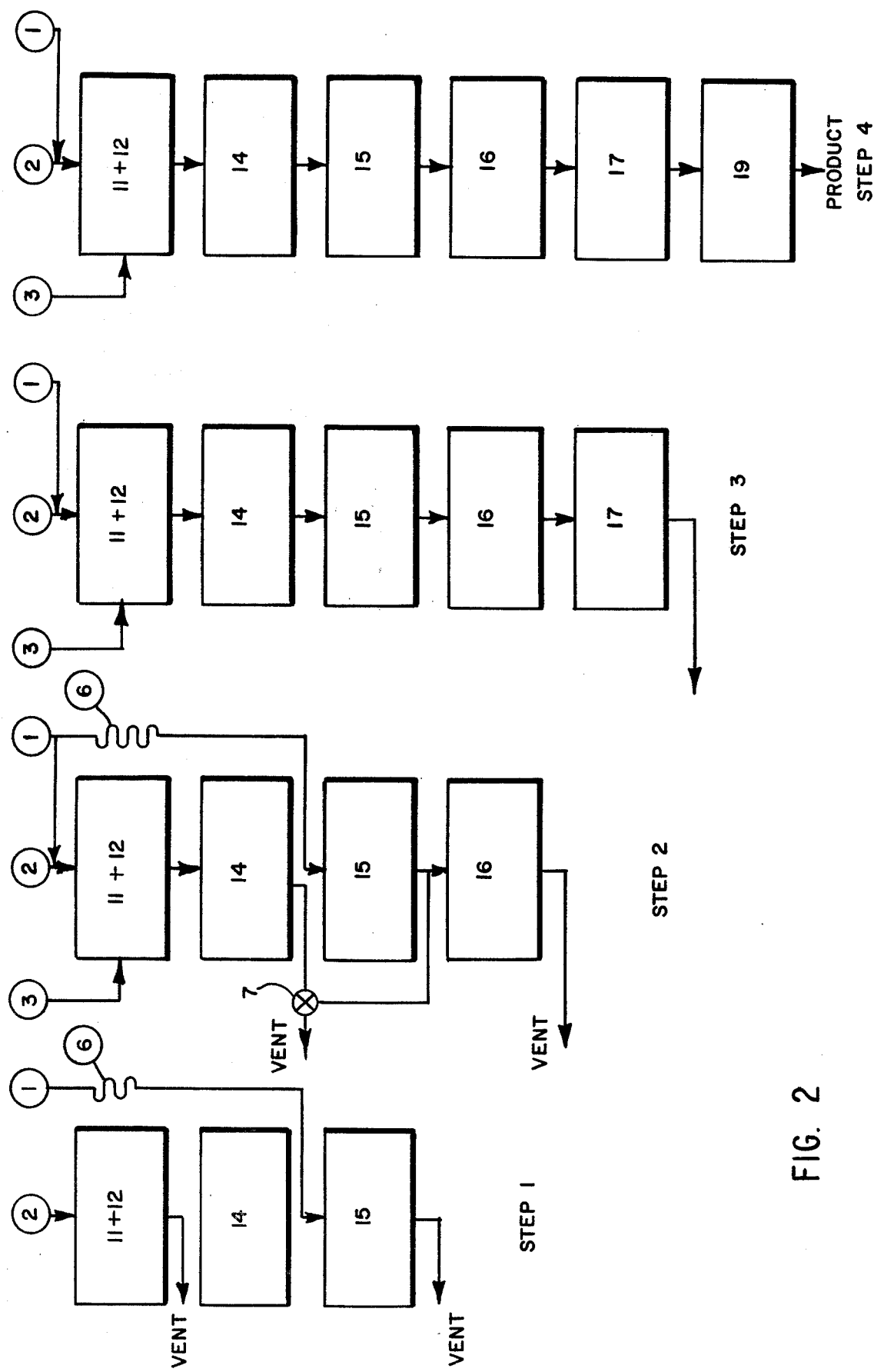
FIG. 2 is a flow chart of a typical ammonia synthesis train.

FIG. 2 shows the exact startup procedure of the invention. Primary and secondary reformers 11 and 12 respectively, are preheated with steam 2 while low temperature CO shifter 15 is simultaneously preheated by preheated desulfurized natural gas 1. Natural gas stream 1 can be preheated after leaving a desulfurizer by an independent source or it can be preheated by waste heat exchanger 6 attached to primary reformer 11 and-/or secondary reformer 12. After reformers 11 and 12 are preheated to a sufficient temperature, about 1000°–1500° F., preheated feed streams of desulfurized natural gas 1 and steam 2 are injected into primary and secondary reformers 11 and 12, along with air to secondary reformer 12 to produce reformed gas. This reformed gas is then used to preheat high temperature CO shifter 14, wherein the reformed gas is converted to converted gas, while at the same time, vented gas from low temperature CO shifter 15 is used to preheat $CO_2$ removal system 16. In addition, the converted gas which is instantaneously produced in high temperature CO shifter 14 is passed through control valve 7 and a portion of this gas is routed to $CO_2$ removal system 16 to aid in its preheating. When the above units have attained a sufficient operating temperature, about 500°–700° F. for high temperature CO shifter 14, about 300°–400° F. for low temperature CO shifter 15, and about 200°–300° F. for $CO_2$ removal system 16, the preheated feed streams from primary and secondary reformers 11 and 12, are passed through the high and low temperature CO shifters 14 and 15, through $CO_2$ removal system 16 and into methanator 17 for the purpose of preheating it. Methanator 17 will attain a sufficient operating temperature at about 500°–600° F. After methanator 17 is preheated, the gaseous mixture is compressed and passed to synthesis converter system 19 which has a converter vessel which is heated by an outside source to about 700°–900° F. Once all the units are brought on stream in a continuous train, the production of ammonia begins and the startup procedure is complete. This procedure reduces the amount of time required for startup as well as providing an energy savings by using a lesser quantity of natural gas. The use of less natural gas or naphtha results in an appreciable cost saving. Furthermore, it is common practice to vent the exhaust gas from each unit to the atmosphere until all units are brought on stream in a continuous train. By simultaneously preheating certain systems instead of sequentially preheating the various systems, one is able to reduce the amount of emissions which are vented to the atmosphere. This has a tremendous environmental effect and will allow the ammonia industry to meet future Environmental Protection Agency's standards.

In an exemplary embodiment of the process of the invention, the primary and secondary reformers are preheated with steam having a temperature of about 1400° F. while the low temperature CO shifter is simultaneously preheated by desulfurized natural gas which is preheated to about 400° F. by waste heat from the primary or secondary reformers, or both. After the reformers are preheated, preheated feed streams of desulfurized natural gas and steam, each at about 1400° F., are introduced into the primary and secondary reformers along with air to about 700° F. to the secondary reformer to produce reformed gas having a temperature of about 2500° F. This reformed gas is then cooled to about 700° F., by using a waste heat exchanger, before using the gas to preheat the high temperature CO shifter. Within the high temperature CO shifter the reformed gas is converted to converted gas having a temperature of about 750° F. and simultaneously vented gas from the low temperature CO shifter, having a temperature of about 350° F. is fed to the $CO_2$ removal vessel. In addition, a portion of the converted gas from the high temperature CO shifter is used to aid in preheating the $CO_2$ removal system. After the aforementioned systems are preheated sufficiently, the preheated feed streams from the primary and secondary reformers are passed through the high and low temperature CO shifters, through the $CO_2$ removal system, and is heated up to about 500° F. before passing into the methanator. Within the methanator an exothermic reaction raises the temperature to about 600° F. which is a sufficient operating temperature. The gaseous mixture from the methanator is then passed to the synthesis converter vessel to preheat it to about 900° F. Once all the systems are brought on stream in a continuous train, the production of ammonia begins and the startup is complete.

Table I shows the time and cost savings realized by practicing the inventive process versus the old procedure.

TABLE I

Comparison of Startup Procedures

| Method | Steam to Reformer | |
|---|---|---|
| New | 8:00 a.m. | |
| Old | 10:00 a.m. | |
| Old | 8:00 a.m. | |
| Start to Heat Methanator | Elapsed Time | Average |
| Midnight | 16 hrs. | 16 hrs. |
| 12:00 Noon | 26 hrs. | 27 hrs. |
| 12:00 Noon | 28 hrs. | |

Time Savings = 27 − 16 = 11 hours
Average fuel gas to unit during startup
    period           = 0.75    M̄SCFH
Average process gas to unit during startup
    period           = 0.70    M̄SCFH
Total Gas Rate      = 1.45    M̄SCFH
Total Gas Savings  = 1.45 M̄SCFH × 11 hrs. = 15.95 M̄SCF
Total Savings =

$$15.95 \text{ M̄SCF} \times \frac{920 \text{ BTU}}{\text{SCF}} \times \frac{\$2}{\text{M̄BTU}} = \$29,300$$

Note:
M̄SCFH = Million Standard Cubic Feet Per Hour
M̄SCF = Million Standard Cubic Feet
M̄BTU = Million British Thermal Units

I claim:

1. An improved startup procedure for the synthesis of ammonia in which preheated feed streams of desulfurized hydrocarbon gas, steam and air routed through an ammonia train having the following equipment, a primary reformer, a secondary reformer, a high temperature CO shifter, a low temperature CO shifter, a $CO_2$ removal system, a methanator and a synthesis converter system for the purpose of producing ammonia, wherein the improvement comprises the following steps:
   (a) preheating said primary and secondary reformers with steam and simultaneously preheating said low temperature CO shifter with preheated desulfurized hydrocarbon gas;
   (b) injecting and preheated feed streams of desulfurized hydrocarbon gas and steam into said primary and secondary reformers along with injecting air into said secondary reformer to produce reformed gas, using said reformed gas to preheat said high temperature CO shifter to provide converted gas, and simultaneously venting said desulfurized hydrocarbon gas from said low temperature CO shifter to said $CO_2$ removal system to preheat said system;
   (c) routing a portion of said converted gas from said high temperature CO shifter to said $CO_2$ removal system to aid in preheating said system;
   (d) routing said preheated feed streams of desulfurized hydrocarbon gas, steam and air from said primary and secondary reformers through said high temperature CO shifter, through said low temperature CO shifter and through said $CO_2$ removal system into said methanator to preheat said vessel; and
   (e) routing said preheated feed streams from step (d) to said synthesis converter system having a converter vessel to preheat said vessel for the production of ammonia.

2. The procedure as recited in claim 1 wherein said hydrocarbon gas is natural gas.

3. The procedure as recited in claim 1 wherein said hydrocarbon gas is naphtha.

4. The procedure as recited in step (a) of claim 1 wherein said desulfurized natural gas is preheated to about 400° F. by waste heat from said primary or said secondary reformer or both.

5. The procedure as recited in claim 2 wherein said preheated feed streams of desulfurized natural gas and steam are preheated to about 1400° F. before entering said primary and secondary reformers.

6. The procedure as recited in claim 2 wherein said air is preheated to about 700° F. before entering said secondary reformers.

7. The procedure as recited in claim 2 wherein said converter vessel is preheated from about 700° F. to about 900° F. before ammonia production starts.

8. An improved startup procedure for the synthesis of ammonia in which preheated feed streams of desulfurized hydrocarbon gas, steam and air are routed through the following equipment, a primary reformer, a secondary reformer, a high temperature CO shifter, a low temperature CO shifter, a $CO_2$ removal system, a methanator and a synthesis converter system for the purpose of producing ammonia, wherein the improvement comprises the following steps:
  (a) preheating said primary and secondary reformers with steam to a temperature of about 1400° F. and simultaneously preheating said low temperature CO shifter with preheated desulfurized hydrocarbon gas to a temperature of about 400° F.;
  (b) injecting said preheated feed streams of desulfurized hydrocarbon gas and steam into said primary and secondary reformers along with injecting air into said secondary reformer to reform said feed streams at temperatures up to about 2500° F. to provide reformed gas, reducing the temperature of said reformed gas to about 700° F., using said reformer gas to preheat said high temperature CO shifter to provide converter gas at a temperature of about 750° F., and simultaneously venting said desulfurized hydrocarbon gas at a temperature of about 400° F. from said low temperature CO shifter to said $CO_2$ removal system to preheat said system;
  (c) routing a portion of said converted gas at a temperature of about 750° F. from said high temperature CO shifter to said $CO_2$ removal system to aid in preheating said system;
  (d) routing said preheated feed streams of desulfurized hydrocarbon gas, steam and air from said primary and secondary reformers through said high temperature CO shifter, through said low temperature CO shifter and through said $CO_2$ removal system and heating up said feed streams to a temperature of about 500° F. before passing said streams into said methanator to preheat said vessel; and
  (e) routing said preheated feed streams from step (d) having a temperature of about 600° F. to said synthesis converter system having a converter vessel to preheat said vessel to about 700°-900° F. for the production of ammonia.

9. The procedure as recited in claim 8 wherein said hydrocarbon gas is natural gas.

10. The procedure as recited in claim 8 wherein said hydrocarbon gas is naphtha.

* * * * *

UNITED STATES PATENT OFFICE
CERTIFICATE OF CORRECTION

Patent No. 4,171,343      Dated October 16, 1979

Inventor(s) Paul J. Faust and Otto C. Pless, Jr.

It is certified that error appears in the above-identified patent and that said Letters Patent are hereby corrected as shown below:

| Patent Column | Line | |
|---|---|---|
| 4 | 22 | "converter gas" should be --converted gas-- |
| 4 | 32 | "0%" should be --0.1%-- |
| 5 | 44 | "to about" should be --at about-- |
| 6 | 32 | "air routed" should be --air are routed-- |
| 8 | 6 | "converter gas" should be --converted gas-- |

Signed and Sealed this

Twelfth Day of February 1980

[SEAL]

Attest:

Attesting Officer

SIDNEY A. DIAMOND

Commissioner of Patents and Trademarks